(12) United States Patent
Ito et al.

(10) Patent No.: US 11,068,211 B2
(45) Date of Patent: Jul. 20, 2021

(54) PRINT CONTROL APPARATUS CAPABLE OF EASILY SETTING SETTINGS OF ADJUSTMENT ITEMS, METHOD OF CONTROLLING SAME, AND STORAGE MEDIUM

(71) Applicant: CANON KABUSHIKI KAISHA, Tokyo (JP)

(72) Inventors: Aya Ito, Tokyo (JP); Hideaki Ooba, Yokohama (JP); Nobuhiro Kawamura, Nagareyama (JP); Yusuke Kimura, Kokubunji (JP)

(73) Assignee: CANON KABUSHIKIKAISHA, Tokyo (JP)

( * ) Notice: Subject to any disclaimer, the term of this patent is extended or adjusted under 35 U.S.C. 154(b) by 0 days.

(21) Appl. No.: 16/737,179

(22) Filed: Jan. 8, 2020

(65) Prior Publication Data
US 2020/0225887 A1 Jul. 16, 2020

(30) Foreign Application Priority Data

Jan. 16, 2019 (JP) .............................. JP2019-005292

(51) Int. Cl.
*G06F 3/12* (2006.01)
*G06K 15/02* (2006.01)

(52) U.S. Cl.
CPC .......... *G06F 3/1204* (2013.01); *G06F 3/1208* (2013.01); *G06F 3/1254* (2013.01); *G06F 3/1256* (2013.01); *G06F 3/1284* (2013.01)

(58) Field of Classification Search
None
See application file for complete search history.

(56) References Cited

U.S. PATENT DOCUMENTS

| | | | |
|---|---|---|---|
| 8,649,030 B2* | 2/2014 | Tokuda | G06F 3/1205 358/1.13 |
| 2003/0197894 A1* | 10/2003 | Miyamoto | G06K 15/00 358/1.18 |
| 2013/0163046 A1* | 6/2013 | Narahashi | G06F 11/079 358/1.15 |
| 2016/0255219 A1* | 9/2016 | Okada | G06F 3/0485 358/1.13 |
| 2017/0008310 A1* | 1/2017 | Van Dun | B41J 11/0005 |
| 2017/0329563 A1* | 11/2017 | Otsuka | G06F 3/1204 |
| 2018/0253052 A1* | 9/2018 | Imai | G03G 15/55 |
| 2019/0037087 A1* | 1/2019 | Kawaguchi | H04N 1/00503 |
| 2019/0205006 A1* | 7/2019 | Li | G06F 3/0488 |

FOREIGN PATENT DOCUMENTS

| | | | | |
|---|---|---|---|---|
| JP | 2003270872 A | | 9/2003 | |
| JP | 2005050059 | * | 2/2005 | ............... G06F 3/12 |
| JP | 2009-205694 | * | 9/2009 | ............... G06F 3/12 |
| JP | 2016215526 A | | 12/2016 | |

* cited by examiner

*Primary Examiner* — Beniyam Menberu
(74) *Attorney, Agent, or Firm* — Rossi, Kimms & McDowell LLP

(57) ABSTRACT

A print control apparatus capable of enabling a user to easily set settings of adjustment items. The print control apparatus controls printing by a print engine. The print control apparatus controls the display of a plurality of adjustment items of the print engine. Out of the plurality of adjustment items, the adjustment items of a specific display group registered by a user are displayed.

15 Claims, 12 Drawing Sheets

| NEW REGISTRATION/EDIT | | |
|---|---|---|
| NAME: THICK PAPER | | |
| BASIS WEIGHT: 140 g/m² COLOR: WHITE ▼ | | |
| SURFACE PROPERTY: HIGH-QUALITY PAPER ▼ | ADJUSTMENT: 816 | DISPLAY GROUP: FAVORITES ▼ — 820 |
| SIZE: A3 ▼ | ADJUSTMENT ITEM | ADJUSTED/UNADJUSTED DISPLAY GROUP — 819 |
| X: [ ] mm (182.0~762.0) INCH | TRAILING END WHITE VOID CORRECTION | ADJUSTED / IMAGE QUALITY/FAVORITE |
| Y: [ ] mm (139.7~330.29) | ADJUSTMENT OF PRIMARY TRANSFER VOLTAGE | UNADJUSTED IMAGE QUALITY/FAVORITE |
| | IMAGE POSITION ADJUSTMENT | ADJUSTED IMAGE POSITION/FAVORITE |
| FEATURE: NONE ▼ | | |
| PAPERMAKING DIRECTION SETTING OF SHEET: OFF | | |
| DOUBLE-SIDED SECOND SIDE: | TRAILING END WHITE VOID CORRECTION | |
| ● UNSET | FRONT SIDE: CORRECTION LEVEL: 0 | |
| ○ SET | FRONT SIDE: CORRECTION AMOUNT: 0 | |
| | REVERSE SIDE: CORRECTION LEVEL: 0 | |
| | REVERSE SIDE: CORRECTION AMOUNT: 0 | |
| FAVORITES: | REGISTRATION/EDIT... | |
| ☐ FAVORITE 1 | | |
| ☐ FAVORITE 2 | EDIT | |
| ☐ FAVORITE 3 | OK   CANCEL | |

PRINT CONTROL APPARATUS CAPABLE OF EASILY SETTING SETTINGS OF ADJUSTMENT ITEMS, METHOD OF CONTROLLING SAME, AND STORAGE MEDIUM

BACKGROUND OF THE INVENTION

Field of the Invention

The present invention relates to a print control apparatus that is capable of easily setting the settings of adjustment items, a method of controlling the same, and a storage medium.

Description of the Related Art

In a production printing market, there is used a print control apparatus that controls printing of various types of sheets, such as thin paper, thick paper, coated paper, and film. This print control apparatus determines a sheet type based on sheet information set for a sheet feed deck that stores sheets. The setting items of the sheet information include basic items, such as a name indicative of the above-mentioned sheet type, and the size and basis weight of the sheets, and adjustment items whose settings are adjusted according to printing conditions. The adjustment items include a large number of items, such as transfer voltage, image position adjustment, and trailing end white void correction. In the print control apparatus, to realize printing with high image quality and high printing accuracy, it is necessary for a user to select a desired item from a large number of items, and set the settings of the selected item, which requires time and effort of the user.

In contrast, for example, the setting of a saddle-stitching position is calculated based on a setting set in the past (see e.g. Japanese Laid-Open Patent Publication (Kokai) No. 2016-215526). Further, pre-set settings of adjustment items are stored on a sheet type-by-sheet type basis (see e.g. Japanese Laid-Open Patent Publication (Kokai) No. 2003-270872). Thus, in the conventional print control apparatus, the user can easily set the settings of the adjustment items.

In the conventional print control apparatus, however, it is sometimes impossible to easily set the settings of adjustment items. For example, in a case where there are no settings set in the past, in the above-described technique disclosed in Japanese Laid-Open Patent Publication (Kokai) No. 2016-215526, the user is required to select a desired adjustment item from a large number of adjustment items, and hence cannot easily set the setting of the adjustment item. Further, in bookbinding printing with illustrations, adjustment of settings of the transfer voltage, the image position, and the trailing end white void correction is important, whereas in monochrome printing for printing only characters, the adjustment of the above-mentioned settings is often not regarded as important. As described above, in a case where even with sheets of the same type, items whose settings are required to be adjusted are different depending on use cases, the user is required, according to the above-described technique disclosed in Japanese Laid-Open Patent Publication (Kokai) No. 2003-270872, to select desired adjustment items from a large number of adjustment items so as to adjust the settings again to settings suitable for a use case. For this reason, the user cannot easily set the settings of the adjustment items.

SUMMARY OF THE INVENTION

The present invention provides a print control apparatus that is capable of enabling a user to easily set the settings of adjustment items, a method of controlling the same, and a storage medium.

In a first aspect of the present invention, there is provided a print control apparatus that controls printing by a print engine, comprising a display control unit configured to control display of a plurality of adjustment items of the print engine, wherein the display control unit displays adjustment items of a specific display group registered by a user, out of the plurality of adjustment items.

In a second aspect of the present invention, there is provided a method of controlling a print control apparatus that controls printing by a print engine, comprising controlling display of a plurality of adjustment items of the print engine, and displaying adjustment items of a specific display group registered by a user, out of the plurality of adjustment items.

In a third aspect of the present invention, there is provided a non-transitory computer-readable storage medium storing a computer-executable program for executing a method of controlling a print control apparatus that controls printing by a print engine, wherein the method comprises controlling display of a plurality of adjustment items of the print engine, and displaying adjustment items of a specific display group registered by a user, out of the plurality of adjustment items.

According to the present invention, it is possible to enable a user to easily set the settings of adjustment items.

Further features of the present invention will become apparent from the following description of exemplary embodiments (with reference to the attached drawings).

BRIEF DESCRIPTION OF THE DRAWINGS

FIG. 8 is a diagram showing an example of a new registration edit screen displayed on the display device appearing in FIG. 1.

FIG. 11 is a diagram showing an example of adjustment items each registered as a favorite.

DESCRIPTION OF THE EMBODIMENTS

The present invention will now be described in detail below with reference to the accompanying drawings showing an embodiment thereof.

Figure 1:
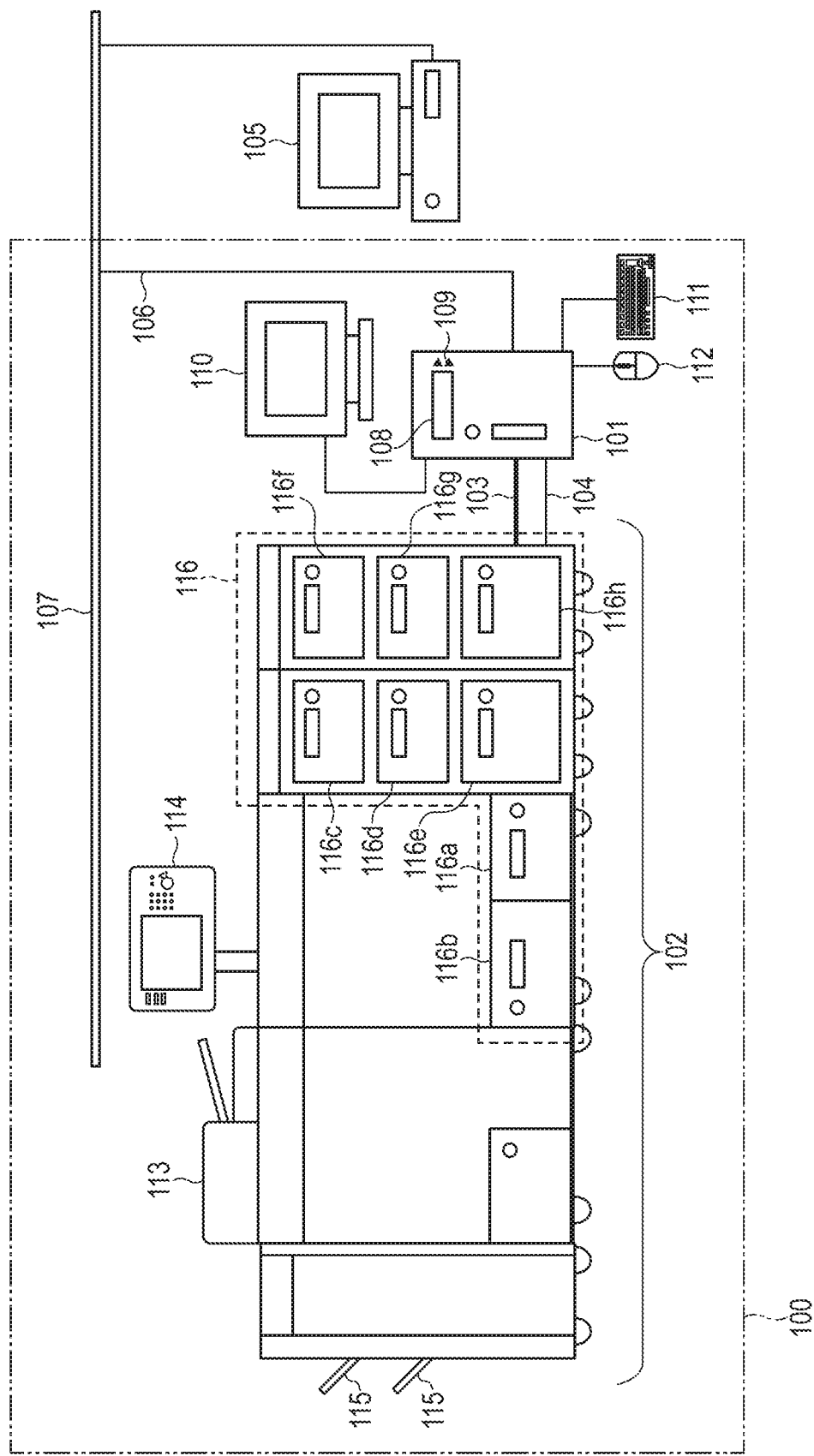
FIG. 1 is a schematic diagram showing the configuration of a printing system including a print control apparatus according to an embodiment of the present invention.

FIG. 1 is a schematic diagram showing the configuration of a printing system 100 including a print control apparatus 101 according to an embodiment of the present invention.

As shown in FIG. 1, the printing system 100 is comprised of the print control apparatus 101 and a printing apparatus 102. The print control apparatus 101 is connected to the printing apparatus 102 via an image video cable 103 and a control cable 104. The printing system 100 is communicably connected to a client computer 105. More specifically, the print control apparatus 101 of the printing system 100 is connected to a LAN (Local Area Network) 107 using an Ethernet (registered trademark) cable 106, and is connected to the client computer 105 via the LAN 107. The printing apparatus 102 is not directly connected to the LAN 107 but communicates via the print control apparatus 101 with the client computer 105. Note that although in the present embodiment, the description is given of the configuration in which the printing apparatus 102 is not directly connected to the LAN 107, the printing apparatus 102 may be directly connected to the LAN 107.

The print control apparatus 101 includes a display section 108 and an operation section 109. The print control apparatus 101 performs an image forming process in cooperation with the printing apparatus 102. The display section 108 displays various information of the print control apparatus 101. A display area of the display section 108 is relatively small. For this reason, only necessary minimum information items for operating the print control apparatus 101, such as information for instructing the powering on/off of the print control apparatus 101 and an IP address of the print control apparatus 101, are displayed on the display section 108. The operation section 109 is formed by at least one hardware key. A user operates the operation section 109 to perform operations related to information displayed on the display section 108. Further, to improve user operability, a display device 110, such as a liquid crystal monitor, a keyboard 111, a pointing device 112, and so forth are connected to the print control apparatus 101. Note that the display device 110 may be configured to have a position input function, similar to that of a touch pad, to thereby also serve as the pointing device 112.

The printing apparatus 102 is a multifunction peripheral having a plurality of functions, such as a print function, a scan function, and a copy function. The printing apparatus 102 includes a scanner section 113, an operation section 114, a sheet discharge section 115, and a sheet feed section 116. The printing apparatus 102 performs image processing based on instructions from the client computer 105 and the print control apparatus 101. The printing apparatus 102 prints out data read by the scanner section 113 on sheets, and discharges the printed sheets onto the sheet discharge section 115. Further, the printing apparatus 102 transmits the data read by the scanner section 113 to a shared folder. The operation section 114 is comprised of software keys and hardware keys. The operation section 114 receives instructions for starting a print job and a scan job, and so forth. Further, the operation section 114 displays various information indicating statuses of jobs and the like, thereon. The sheet feed section 116 includes a plurality of, e.g. eight, sheet feed decks 116a to 116h. Note that in the present embodiment, the number of sheet feed decks provided in the sheet feed section 116 can be changed. The respective sheet feed decks 116a to 116h store sheets for use in printing. The client computer 105 activates an application installed thereon to thereby give a print instruction to the printing system 100.

Figure 2:
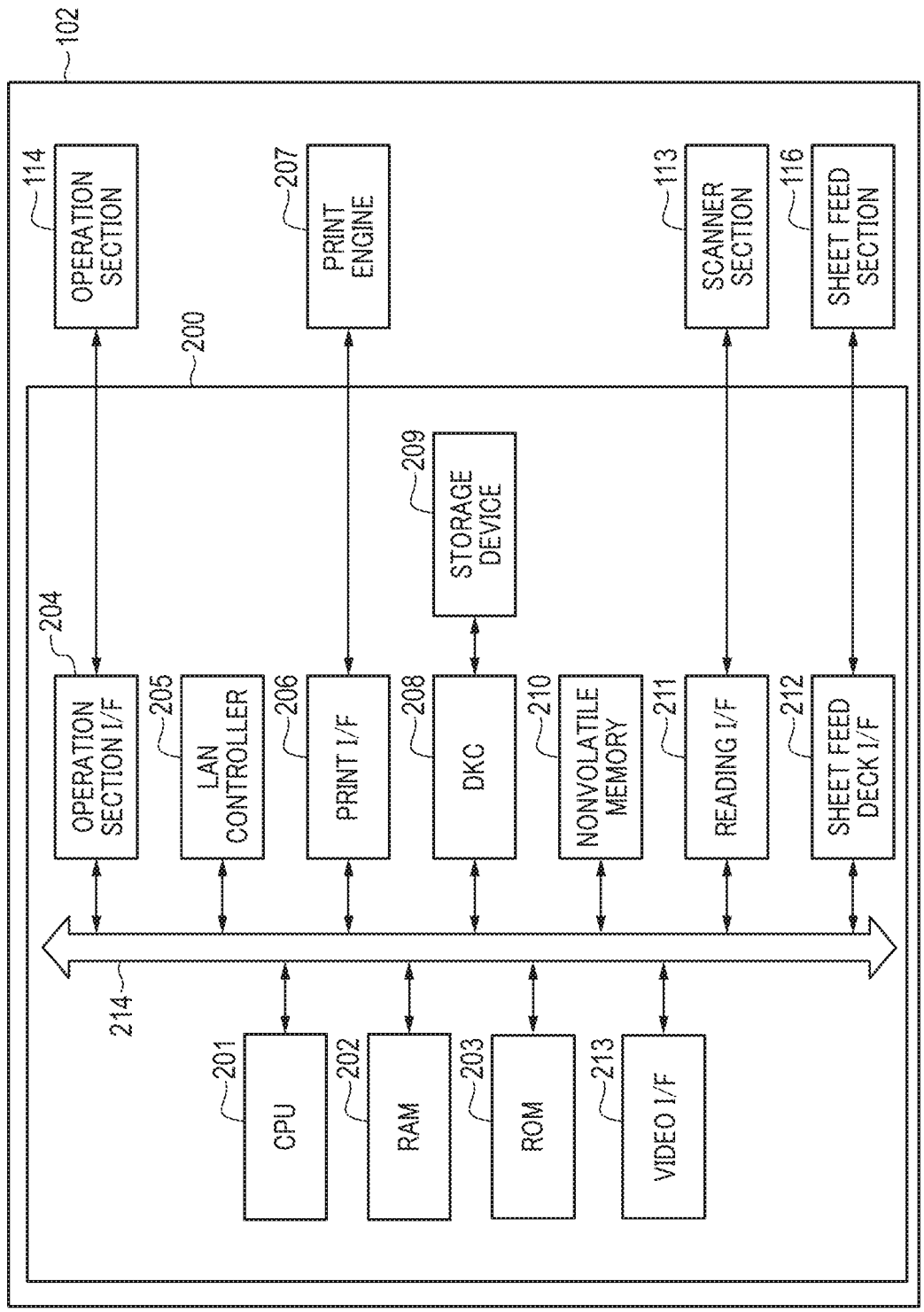
FIG. 2 is a schematic block diagram showing a hardware configuration of a printing apparatus appearing in FIG. 1.

FIG. 2 is a schematic block diagram showing a hardware configuration of the printing apparatus 102 in FIG. 1. Referring to FIG. 2, the printing apparatus 102 includes a controller 200 and a print engine 207 in addition to the above-mentioned scanner section 113, operation section 114, and sheet feed section 116. The controller 200 is connected to the scanner section 113, the operation section 114, the sheet feed section 116, and the print engine 207. The controller 200 includes a CPU 201, a RAM 202, a ROM 203, an operation section interface 204, a LAN controller 205, a print interface 206, and a DKC (Disk Controller) 208. Further, the controller 200 includes a storage device 209, a nonvolatile memory 210, a read interface 211, a sheet feed deck interface 212, and a video interface 213. The CPU 201, the RAM 202, the ROM 203, the operation section interface 204, the LAN controller 205, the print interface 206, the DKC 208, the nonvolatile memory 210, the read interface 211, the sheet feed deck interface 212, and the video interface 213 are connected to each other via a system bus 214. The storage device 209 is connected to the DKC 208.

The controller 200 controls the overall operation of the printing apparatus 102. The CPU 201 controls the devices connected to the system bus 214 based on control programs stored in the ROM 203 or the storage device 209. For example, the CPU 201 controls the print interface 206 to transmit image signals as output information to the print engine 207 connected to the print interface 206. Further, the CPU 201 controls the read interface 211 to receive image signals from the scanner section 113 connected to the read interface 211. The RAM 202 is used as a work area for the CPU 201 or an area for temporarily storing various data. The ROM 203 stores the control programs executed by the CPU 201 and so forth. The operation section interface 204 outputs information input by the user to the operation section 114, to the CPU 201. The LAN controller 205 controls data communication with the print control apparatus 101. The print interface 206 transmits and receives data to and from the print engine 207. The print engine 207 performs printing on sheets. The DKC 208 controls access to the storage device 209.

The storage device 209 is e.g. an HDD or an IC card. The storage device 209 stores application programs, font data, form data, job logs, image logs, etc. Further, the storage device 209 is used as a job storage area for temporarily spooling a print job, and controlling the spooled print job from outside. Furthermore, the storage device 209 stores image data read from the scanner section 113 and image data of the print job as BOX data. The user can view a list of the image data stored as the BOX data from the print control apparatus 101.

The nonvolatile memory 210 stores setting information set e.g. from the operation section 114 or the print control apparatus 101. The read interface 211 transmits and receives data to and from the scanner section 113. The sheet feed deck interface 212 detects opening and closing of the sheet feed decks 116a to 116h by respective opening/closing detection sensors (not shown) to manage information of stacking states of sheets on the respective sheet feed decks 116a to 116h. The video interface 213 receives image data from the print control apparatus 101.

Figure 3A:
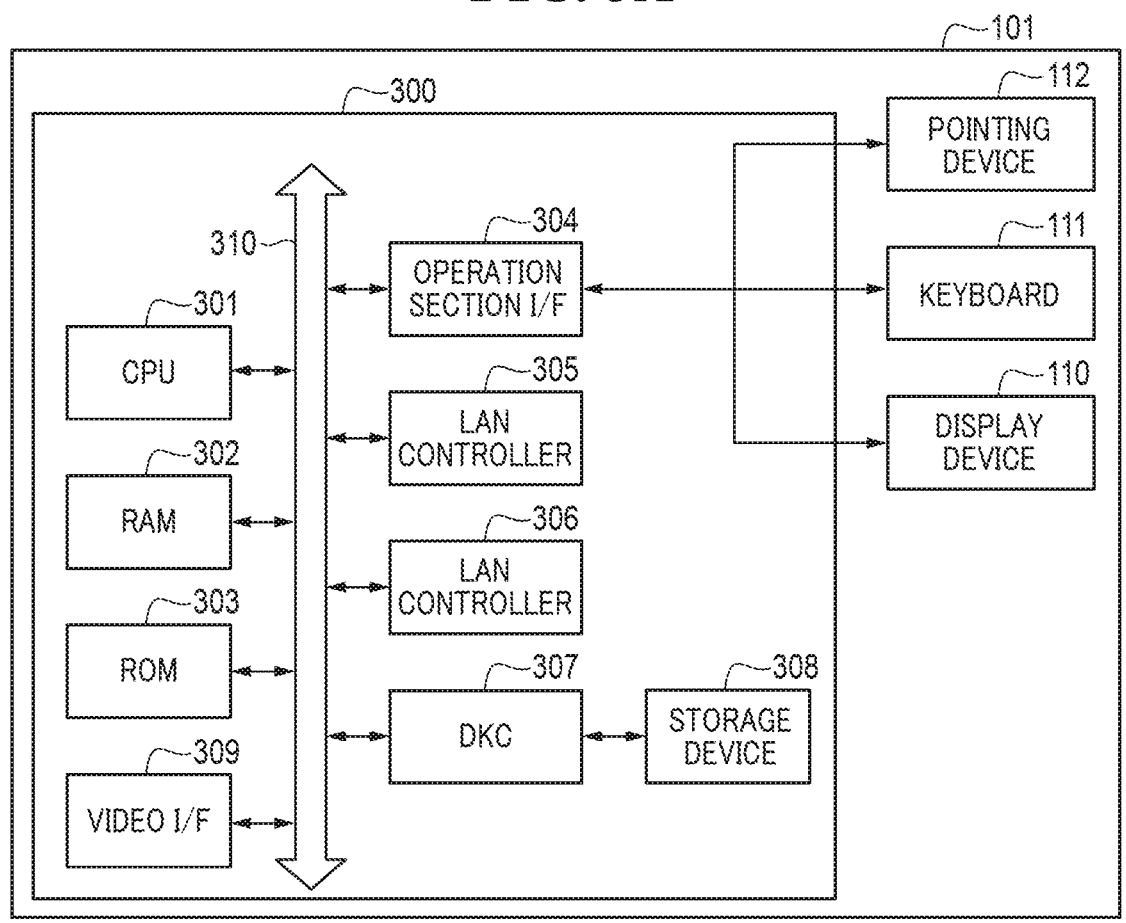
FIG. 3A is a schematic block diagram showing a hardware configuration of the print control apparatus appearing in FIG. 1.
Figure 3B:
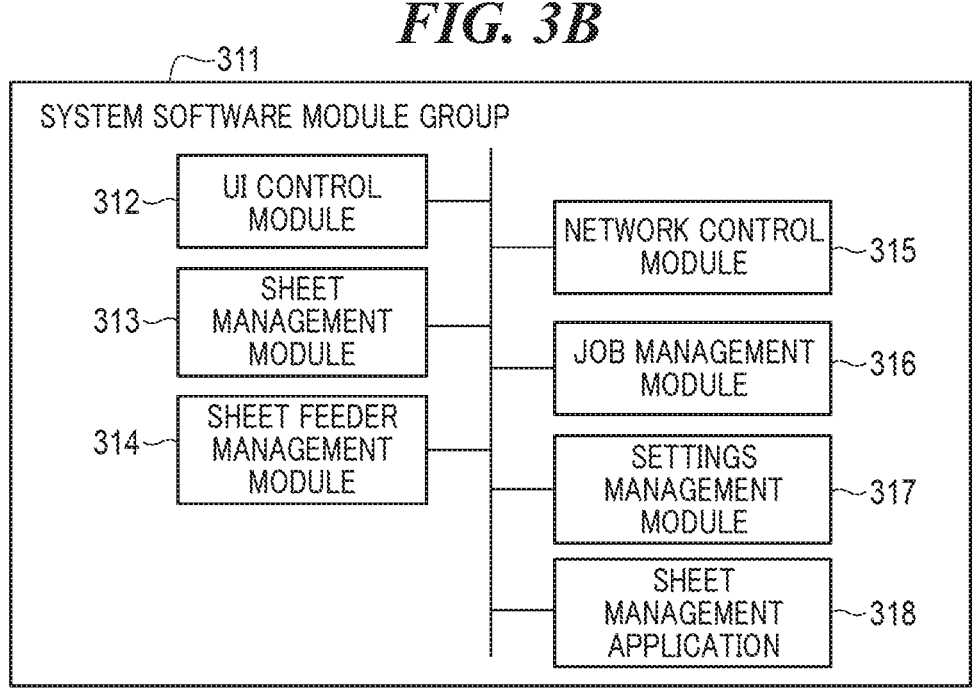
FIG. 3B is a schematic block diagram showing a software configuration of the print control apparatus appearing in FIG. 1.

FIGS. 3A and 3B are schematic block diagrams showing configurations of the print control apparatus 101 in FIG. 1. FIG. 3A shows a hardware configuration of the print control apparatus 101, and FIG. 3B shows a software configuration of the print control apparatus 101.

Referring to FIG. 3A, the print control apparatus 101 includes a controller 300. The controller 300 is comprised of a CPU 301, a RAM 302, a ROM 303, an operation section interface 304, LAN controllers 305 and 306, a DKC 307, a storage device 308, and a video interface 309. The CPU 301, the RAM 302, the ROM 303, the operation section interface 304, the LAN controllers 305 and 306, the DKC 307, and the video interface 309 are connected to each other via a system bus 310. The storage device 308 is connected to the DKC 307.

The controller 300 controls the overall operation of the print control apparatus 101. The CPU 301 controls a system software module group 311, described hereinafter with reference to FIG. 3B, based on control programs stored in the ROM 303 or the storage device 308. The RAM 302 is used as a work area for the CPU 301 or an area for temporarily storing various data. The ROM 303 stores the control programs executed by the CPU 301, and so forth.

The operation section interface 304 acquires information input by the user from the operation section 109 and controls the display on the display section 108 based on the acquired information. Further, the operation section interface 304 transmits and receives data to and from the display device 110, the keyboard 111, and the pointing device 112, which are connected to the print control apparatus 101. For example, the operation section interface 304 acquires information input by the user using the keyboard 111 or the pointing device 112. Further, the operation section interface 304 renders image data in a video memory provided in the operation section interface 304 based on instructions from the CPU 301, and outputs the rendered image data to the display device 110 as video signals.

The LAN controller 305 controls data communication with the printing apparatus 102. The LAN controller 306 controls data communication with an apparatus, such as the client computer 105, which is connected to the print control apparatus 101 via the LAN 107. The DKC 307 controls access to the storage device 308. The storage device 307 is e.g. an HDD or an IC card. The storage device 308 stores application programs, font data, form data, and so forth. Further, the storage device 308 temporarily spools a print job. The video interface 309 transmits image data having been processed by a RIP (Raster Image Processor) to the printing apparatus 102.

Referring to FIG. 3B, the system software module group 311 is comprised of a UI control module 312, a sheet management module 313, a sheet feeder management module 314, a network control module 315, a job management module 316, a settings management module 317, and a sheet management application 318. Processing operations of the system software module group 311 are performed by the CPU 301 executing corresponding programs which are loaded from the ROM 303 or the storage device 308 into the RAM 302.

The UI control module 312 controls the display on the display device 110. More specifically, the UI control module 312 generates images which represent the status of a print job indicated by information acquired from the job management module 316, the status of a device indicated by information acquired from the sheet feeder management module 314, and so forth. The UI control module 312 causes the display device 110 to display the generated images. The sheet management module 313 manages sheets by synchronizing sheet information stored in the HDD 211 of the printing apparatus 102 and sheet information stored in the HDD 309 of the print control apparatus 101. The setting items of the sheet information include basic items, such as names indicative of the types of sheets printable by the printing apparatus 102, and the sizes and basis weights of the sheets, and adjustment items of the print engine 207 of which settings are adjusted according to printing conditions. The adjustment items include a large number of items, such as transfer voltage, image position adjustment, trailing end white void correction.

The sheet feeder management module 314 manages sheet feed deck information acquired from the printing apparatus 102. The sheet feed deck information includes information indicative of the types of sheet feed decks 116a to 116h, such as an option deck, a manual feed tray, and a long sheet tray, and information indicative of the types of sheets stored in the respective sheet feed decks 116a to 116h (hereinafter referred to as the "sheet type information"). Further, the sheet feeder management module 314 notifies the printing apparatus 102 of sheet feed deck information set by the print control apparatus 101.

Figure 4A:
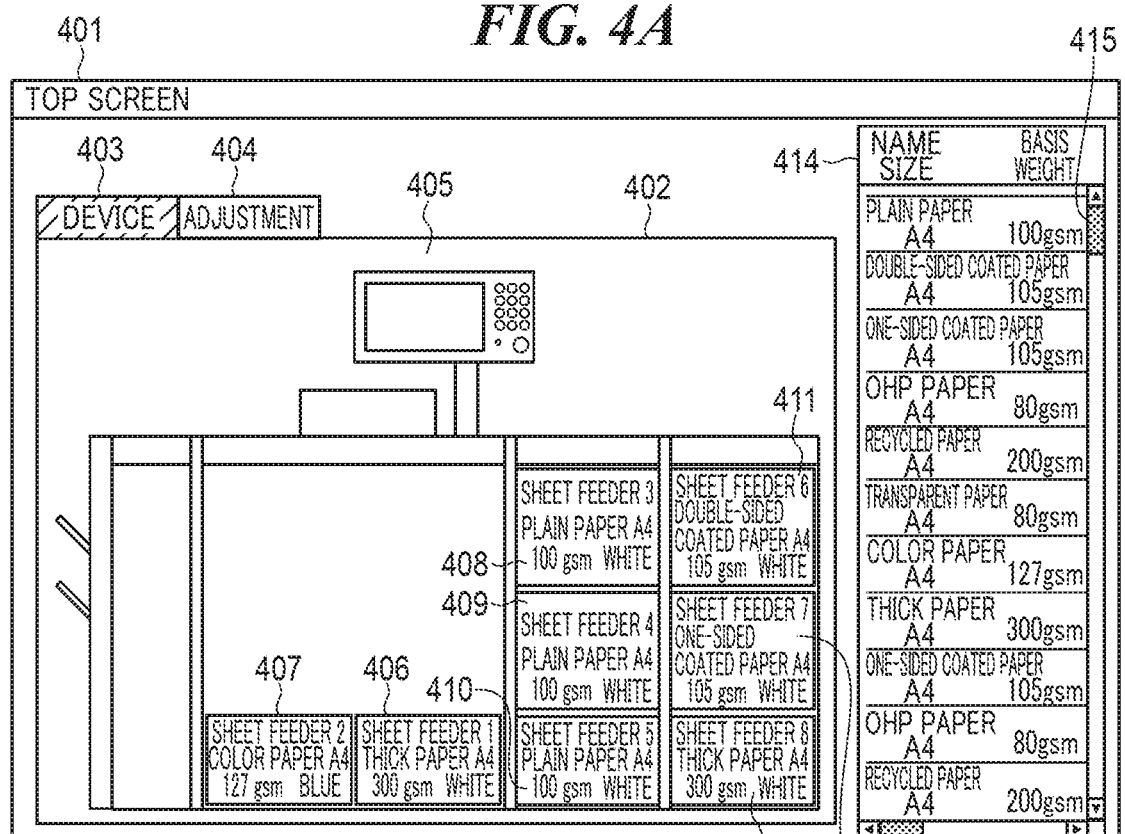
FIG. 4A is a diagram of a top screen for setting the settings of adjustment items of a print engine, which is displayed on a display device appearing in FIG. 1.

The network control module 315 controls data communication with the printing apparatus 102 e.g. via the LAN controller 305. Further, the network control module 315 controls data communication with the client computer 105 via the LAN controller 306. The job management module 316 monitors the status of a print job received via the LAN controller 306. Further, the job management module 316 outputs information indicative of the status of the print job to the UI control module 312. The settings management module 317 manages settings of the sheet management application 318 as a whole, including the setting of a display language, etc. The sheet management application 318 is an application by which the print control apparatus 101 performs the image forming process in cooperation with the printing apparatus 102, and is installed in the print control apparatus 101. The sheet management application 318 causes the display device 110 to display, for example, a top screen 401 shown in FIG. 4A for setting the settings of the adjustment items of the print engine 207. Referring to FIG. 4A, the top screen 401 is formed by display areas 402 and 414. In the display area 402, contents to be displayed on the top screen 401 are switched according to which of a device tab 403 and an adjustment tab 404 is selected by the user.

In a case where the user selects the device tab 403, in the display area 402, a connection status image 405 appearing in FIG. 4A is displayed which represents a connection status of hardware options of the printing apparatus 102. The display of the connection status of the hardware options is controlled based on hardware option information acquired from the printing apparatus 102 when the sheet management application 318 is started. The hardware option information is information concerning the options of the sheet feed decks, a finisher, etc. connected to the printing apparatus 102. FIG. 4A shows a state in which so-called POD decks are connected in parallel, and at the same time the finisher is connected, by way of example. In the display area 402, sheet feeder buttons 406 to 413 representing the respective sheet feed decks 116a to 116h are displayed. The display of the sheet feeder buttons 406 to 413 is controlled based on sheet feed deck information acquired from the printing apparatus 102 when the sheet management application 318 is started.

Figure 4B:
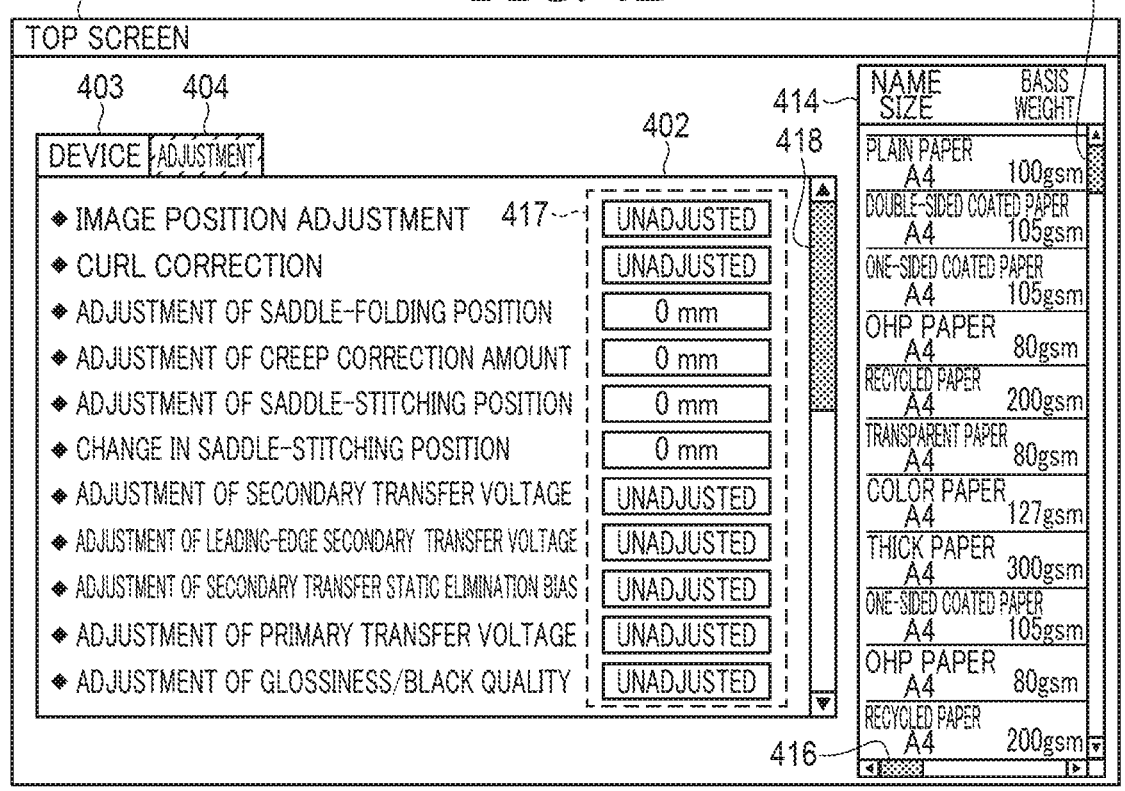
FIG. 4B is a diagram of the top screen in a state in which a button group for shifting a display screen to a setting screen for each of adjustment items of the print engine is displayed.

In a case where the user selects the adjustment tab 404, in the display area 402, there is displayed a button group 417 for shifting to a setting screen for setting each of the adjustment items of the print engine 207 (see e.g. FIG. 4B). Referring to FIG. 4B, by operating a slider bar 418, the user can display in the display area 402 buttons associated with other adjustment items which are not displayed in the display area 402.

In the display area 414, list information concerning the types of sheets printable by the printing apparatus 102 (hereinafter referred to as the "sheet list") is displayed based on sheet information acquired from the printing apparatus 102. The sheet type information, such as plain paper and double-side coated paper, is displayed in a state enumerated in the vertical direction of the display area 414. The user can view sheet type information which is not displayed in the display area 414, by operating a slider bar 415. Further, attribute information of the sheets, such as the sizes and basis weights of the sheets, is displayed in a state enumerated in the left-right direction of the display area 414. The user can view attribute information of sheets, which is not displayed in the display area 414, by operating a slider bar 416.

Figure 5:
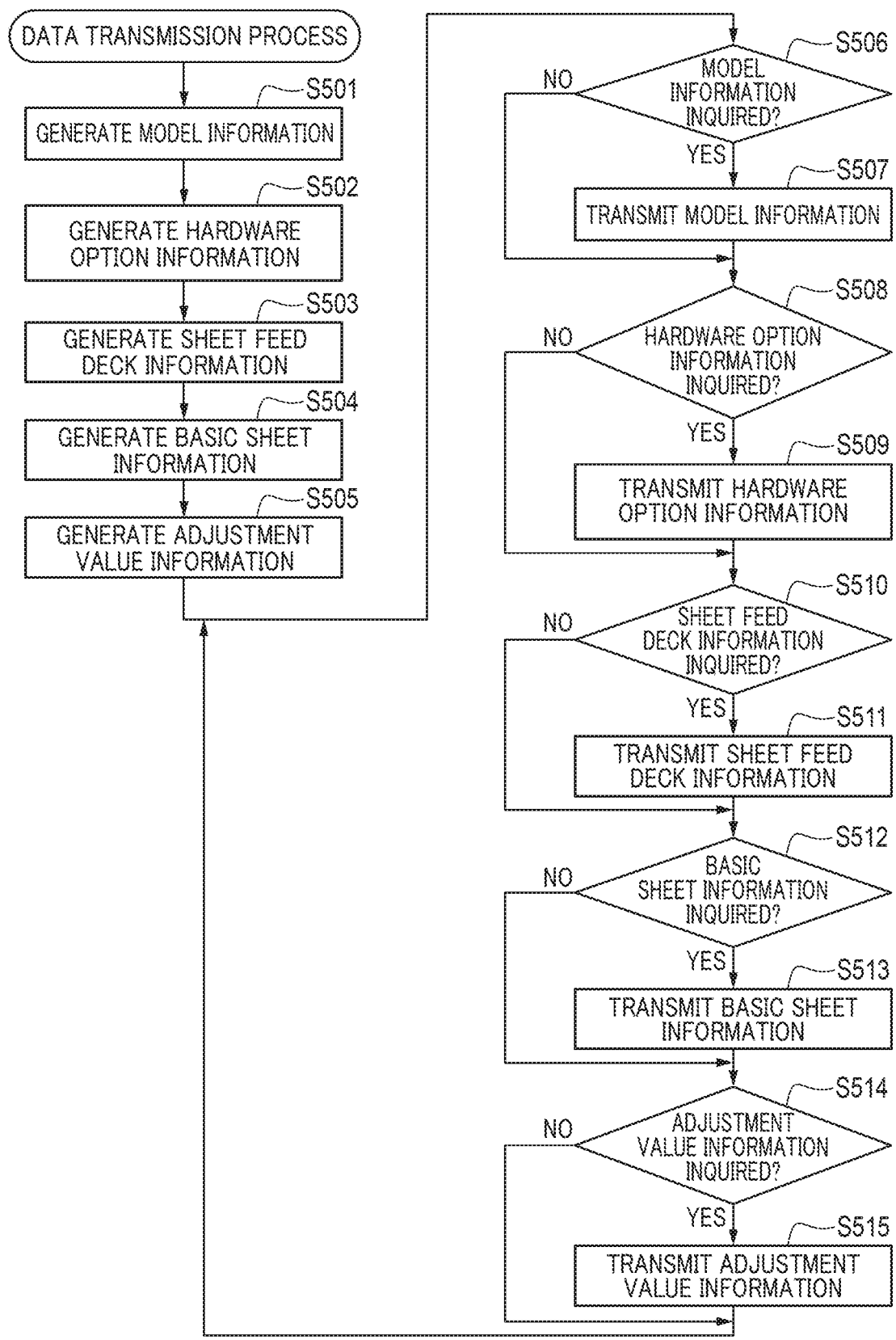
FIG. 5 is a flowchart of a data transmission process performed by the printing apparatus appearing in FIG. 1.

FIG. 5 is a flowchart of a data transmission process performed by the printing apparatus 102 appearing in FIG. 1.

The process in FIG. 5 is performed by the CPU 201 executing a corresponding program loaded from the ROM 303 or the storage device 209 into the RAM 202. The process in FIG. 5 is executed, for example, when the printing apparatus 102 is started.

Referring to FIG. 5, first, the CPU 201 generates model information indicative of the model of the printing apparatus 102, hardware option information, and sheet feed deck information, based on the device information of the printing apparatus 102, which is stored in the storage device 209 (steps S501 to S503). Then, the CPU 201 generates sheet information formed by basic items, such as names indicative of the types of sheets printable by the printing apparatus 102, and the sizes and basis weights of the sheets, and the adjustment items of the print engine 207. More specifically, the CPU 201 generates basic sheet information including the settings of the basic items (step S504), and generates adjustment value information including the settings of the adjustment items of the print engine 207 (step S505). Then, the CPU 201 determines whether or not an inquiry about the model information has been received from the print control apparatus 101 (step S506).

If it is determined in the step S506 that no inquiry about the model information has been received from the print control apparatus 101, the CPU 201 executes a step S508, described hereinafter. If it is determined in the step S506 that an inquiry about the model information has been received from the print control apparatus 101, the CPU 201 transmits the model information to the print control apparatus 101 (step S507). Next, the CPU 201 determines whether or not an inquiry about the hardware option information has been received from the print control apparatus 101 (step S508).

If it is determined in the step S508 that no inquiry about the hardware option information has been received from the print control apparatus 101, the CPU 201 executes a step S510, described hereinafter. If it is determined in the step S508 that an inquiry about the hardware option information has been received from the print control apparatus 101, the CPU 201 transmits the hardware option information to the print control apparatus 101 (step S509). Then, the CPU 201 determines whether or not an inquiry about the sheet feed deck information has been received from the print control apparatus 101 (step S510).

If it is determined in the step S510 that no inquiry about the sheet feed deck information has been received from the print control apparatus 101, the CPU 201 executes a step S512, described hereinafter. If it is determined in the step S510 that an inquiry about the sheet feed deck information has been received from the print control apparatus 101, the CPU 201 transmits the sheet feed deck information to the print control apparatus 101 (step S511). Then, the CPU 201 determines whether or not an inquiry about the basic sheet information has been received from the print control apparatus 101 (step S512).

If it is determined in the step S512 that no inquiry about the basic sheet information has been received from the print control apparatus 101, the CPU 201 executes a step S514, described hereinafter. If it is determined in the step S512 that an inquiry about the basic sheet information has been received from the print control apparatus 101, the CPU 201 transmits the basic sheet information to the print control apparatus 101 (step S513). Then, the CPU 201 determines whether or not an inquiry about the adjustment value information has been received from the print control apparatus 101 (step S514).

If it is determined in the step S514 that no inquiry about the adjustment value information has been received from the print control apparatus 101, the CPU 201 returns to the step S506. If it is determined in the step S514 that an inquiry about the adjustment value information has been received from the print control apparatus 101, the CPU 201 transmits the adjustment value information to the print control apparatus 101 (step S515), and returns to the step S506.

Figure 6:
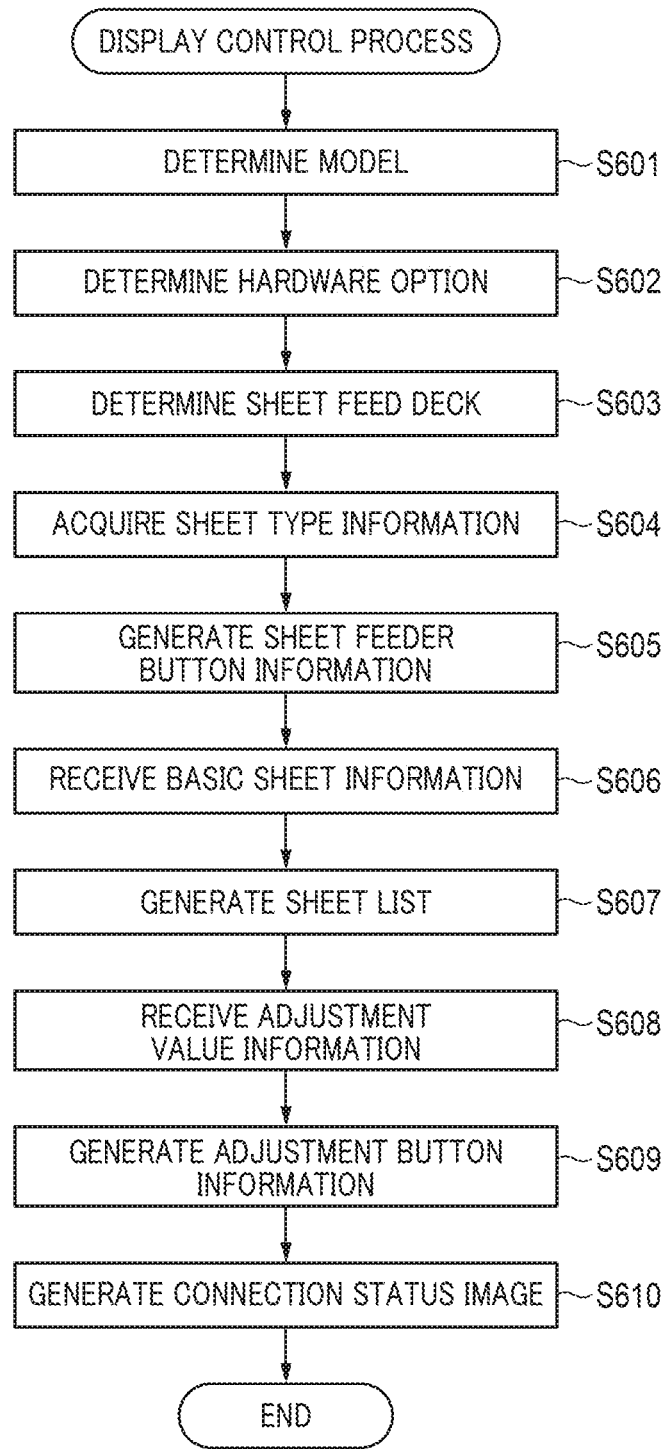
FIG. 6 is a flowchart of a display control process performed by a sheet management application appearing in FIG. 3B.

FIG. 6 is a flowchart of a display control process performed by the sheet management application 318 appearing in FIG. 3B.

The process in FIG. 6 is performed by the CPU 301 executing a corresponding program loaded from the ROM 303 or the storage device 308 into the RAM 302. The process in FIG. 6 is executed, for example, when the sheet management application 318 is started. When the sheet management application 318 is started, the print control apparatus 101 transmits an inquiry about the model information to the printing apparatus 102.

Referring to FIG. 6, the sheet management application 318 receives the model information from the printing apparatus 102 as a response to the above-mentioned inquiry and determines the model of the printing apparatus 102 based on the received model information (step S601). A result of the determination in the step S601 is used, for example, when the display of the connection status of the hardware options, as shown in FIG. 4A, is controlled, or when specification differences between models are accommodated. Then, the sheet management application 318 transmits an inquiry about the hardware option information to the printing apparatus 102. Upon receipt of the hardware option information from the printing apparatus 102 as a response to the inquiry, the sheet management application 318 determines hardware options connected to the printing apparatus 102 based on the received hardware option information (step S602). A result of the determination in the step S602 is used, for example, when the display of the connection status of the hardware options, as shown in FIG. 4A, is controlled, when the sheet feed deck information is identified, or when the specification differences between the models are accommodated.

Then, the sheet management application 318 transmits an inquiry about the sheet feed deck information to the printing apparatus 102. Upon receipt of the sheet feed deck information from the printing apparatus 102 as a response to the inquiry, the sheet management application 318 determines sheet feed decks connected to the printing apparatus 102 based on the received sheet feed deck information (step S603). Further, the sheet management application 318 identifies the number of the sheet feed decks connected to the printing apparatus 102. Then, the sheet management application 318 acquires sheet type information of each of the sheet feed decks 116a to 116h from the sheet feed deck information (step S604).

Next, the sheet management application 318 generates sheet feeder button information to be displayed on the sheet feeder buttons 406 to 413 on the top screen 401 (step S605). Then, the sheet management application 318 transmits an inquiry about the basic sheet information to the printing apparatus 102. Upon receipt of the basic sheet information from the printing apparatus 102 as a response to the inquiry (step S606), the sheet management application 318 generates a sheet list to be displayed in the display area 414 based on the received basic sheet information (step S607). Then, the sheet management application 318 transmits an inquiry about the adjustment value information to the printing apparatus 102. Upon receipt of the adjustment value information from the printing apparatus 102 as a response to the inquiry (step S608), the sheet management application 318 generates adjustment button information to be displayed on each button of the button group 417 based on the received adjustment value information (step S609). In the step S609, as adjustment button information of a button with which only one adjustment value is associated, a character string indicating the adjustment value is generated. On the other hand, as adjustment button information of a button with which a plurality of adjustment values are associated, a character string of "adjusted/unadjusted", for example, is generated.

Next, the sheet management application 318 generates the connection status image 405 based on the model information, the hardware option information, the sheet feeder button information, the sheet list, and the adjustment button information (step S610), followed by terminating the present process.

Although in the present embodiment, the description is given assuming that the display control process described above with reference to FIG. 6 is performed when the sheet management application 318 is started, the display control process may be performed in a predetermined timing other than when the sheet management application 318 is started.

Figure 7:
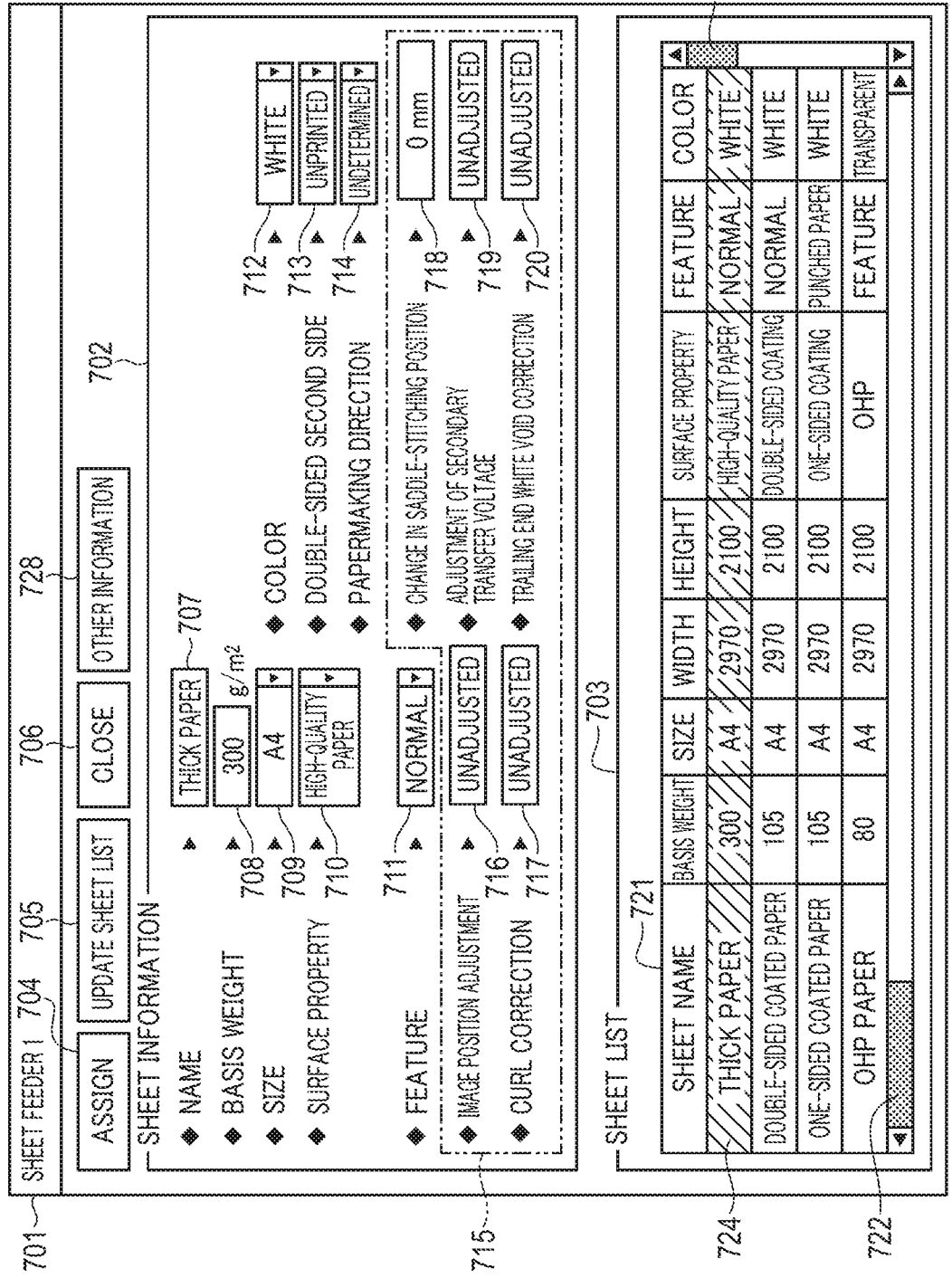
FIG. 7 is a diagram showing an example of a sheet setting screen displayed on the display device appearing in FIG. 1.

As described above, in the print control apparatus 101, the display of the top screen 401 is controlled. Here, in a case where the user selects one of the sheet feeder buttons 406 to 413 in the connection status image 405 on the top screen 401, for example, the sheet feeder button 406, a sheet setting screen 701 shown in FIG. 7 is displayed on the display device 110. The sheet setting screen 701 is for setting information on sheets to be stored in the sheet feed deck 116a associated with the sheet feeder button 406. The sheet setting screen 701 is comprised of a sheet information display area 702, a sheet list display area 703, an assign button 704, a sheet list update button 705, a closing button 706, and an "other information" button 728.

Information on the sheets stored in the sheet feed deck 116a is displayed in the sheet information display area 702. In the sheet list display area 703, a sheet list 721 is displayed. When the user selects information on certain sheets from the sheet list 721, the information on the selected sheets is displayed in the sheet information display area 702.

Next, a description is given of each input item of the sheet information display area 702. The type of the sheets is input to a text field 707 and the basis weight of the sheets is input to a text field 708, by the user. In a combo box 709, as the size of the sheets, one setting is selected by the user from a list registered in advance. In a combo box 710, as surface property information of the sheets, one setting is selected by the user from a list registered in advance. In a combo box 711, as feature information of the sheets, one setting is selected by the user from a list registered in advance. In a combo box 712, as color information of the sheets, one setting is selected by the user from a list registered in advance. In a combo box 713, as double-sided second side information of sheets, one setting is selected by the user from a list registered in advance. In a combo box 714, as papermaking direction information of the sheets, one setting is selected by the user from a list registered in advance.

The adjustment items of the print engine 207 are displayed in an adjustment item display area 715. Since the number of the adjustment items of the print engine 207 is large, not all the adjustment items are accommodated in the adjustment item display area 715. Therefore, by selecting the "other information" button 728 to open a new registration edit screen 801, described hereinafter with reference to FIG. 8, the user can view adjustment items which are not displayed in the adjustment item display area 715. A setting item button 716 is for displaying a setting screen concerning an image position, which is one of the adjustment items of the print engine 207. On the setting item button 716, information is displayed which indicates whether or not image position adjustment on the sheets set in the sheet information display area 702 has been performed. If the image position adjustment has been performed, "adjusted", which indicates that the image position adjustment has been performed, is displayed on the setting item button 716. On the other hand, if the image position adjustment has not been performed, "unadjusted", which indicates that the image position adjustment has not been performed, is displayed on the setting item button 716. A setting item button 717 is for displaying a setting screen concerning curl correction, which is one of the adjustment items of the print engine 207. A setting item button 718 is for displaying a setting screen concerning a saddle-stitching position, which is one of the adjustment items of the print engine 207. On the setting item button 718, a setting value already set is displayed in units of mm. A setting item button 719 is for displaying a setting screen concerning a secondary transfer voltage, which is one of the adjustment items of the print engine 207. A setting item button 720 is for displaying a setting screen concerning the trailing end white void correction, which is one of the adjustment items of the print engine 207. When the user selects the sheet list update button 705, setting values included in information, for example, information 724, selected from the sheet list 721 by the user are updated to settings input to the sheet information display area 702.

Next, a description is given of the sheet list display area 703. Attribute information of the sheets is displayed in a state enumerated in the left-right direction of the sheet list 721 displayed in the sheet list display area 703. By operating a slider bar 722, the user can view attribute information of the sheets, which is not displayed in the sheet list display area 703. Further, sheet type information is displayed in a state enumerated in the vertical direction of the sheet list 721. By operating a slider bar 723, the user can view sheet type information which is not displayed in the sheet list display area 703. When the user selects the assign button 704 in a state where information on certain sheets, for example, the information 724, has been selected from the sheet list 721 in the sheet list display area 703, the information 724 is set as the information on the sheets stored in the sheet feed deck 116a.

Figure 8:
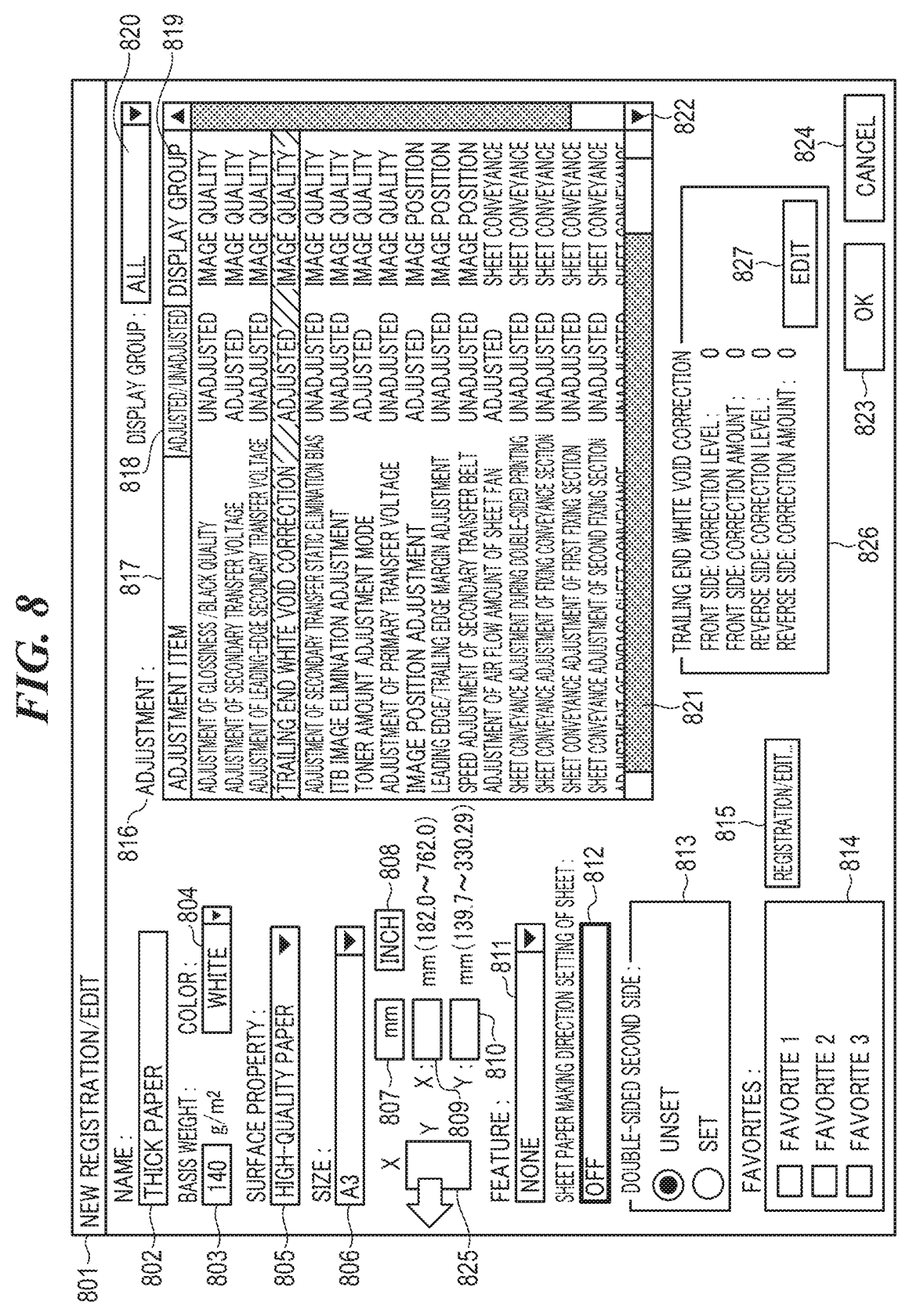

FIG. 8 is a diagram showing an example of the new registration edit screen 801 displayed on the display device 110 in FIG. 1. The new registration edit screen 801 is displayed on the display device 110 when the user selects the "other information" button 728 on the sheet setting screen 701. Alternatively, the new registration edit screen 801 is displayed on the display device 110 when the user selects a "new registration" button (not shown) included in a sheet list displayed in the display area 414 on the top screen 401. As shown in FIG. 8, the new registration edit screen 801 is comprised of a plurality of input items. A name indicative of a type of sheets is input to a text field 802 by the user. A basis weight of the sheet is input to a text field 803 by the user. In a combo box 804, as color information of the sheets, one setting is selected by the user from a list registered in advance. In a combo box 805, as surface property information of the sheets, one setting is selected by the user from a list registered in advance.

In a combo box 806, as size information of the sheets, one setting is selected by the user from a list registered in advance. When the user selects a "custom size" in the combo box 806, it becomes possible to operate a "mm" button 807, an "inch" button 808, a text field 809, and a text field 810. In a case where the "mm" button 807 is selected, setting values input to the text fields 809 and 810 are set in units of mm. In a case where the "inch" button 808 is selected, setting values input to the text fields 809 and 810 are set in units of inches. A setting value input to the text field 809 indicates a length of sheets in an X direction of a sheet image 825. A setting value input to the text field 810 indicates a length of the sheets in a Y direction of the sheet image 825.

In a combo box 811, as feature information of the sheets, one setting is selected by the user from a list registered in advance. In a combo box 812, as papermaking direction information of the sheets, one setting is selected by the user from a list registered in advance. In a radio button 813, the setting of double-sided second side information of the sheets is set. In a check box 814, it is set whether or not to register the sheets set on the new registration edit screen 801 as a favorite. A registration edit button 815 is for opening a registration edit screen (not shown). From the registration edit screen, the user can add a new favorite item and set an icon used for the favorite.

A list of adjustment items is displayed in an adjustment item selection field 816. In a column of adjustment items 817, names of the adjustment items are displayed. In a column of adjusted/unadjusted 818, information indicative of whether or not each adjustment item has been adjusted is displayed. For example, "adjusted" is displayed for adjustment items whose settings have been changed from their initial values and adjustment items whose settings have been changed within a predetermined time period, for notifying that the adjustment items have been adjusted. On the other hand, "unadjusted" is displayed for adjustment items whose setting values have not been changed from their initial values or within the predetermined time period, for notifying that the adjustment items have not been adjusted. In a column of display group 819, names of display groups into which displayed adjustment items are classified are displayed. Each adjustment item is classified into one of display groups e.g. of image quality, image position, sheet conveyance, curl correction, and finishing, based on attributes thereof. The user can filter the adjustment item selection field 816 by selecting one of the above-mentioned display groups in a combo box 820. For example, in a case where "image position" is selected in the combo box 820, out of the plurality of adjustment items, only "image position adjustment", "leading edge/trailing edge margin adjustment", and "speed adjustment of secondary transfer belt", belonging to the display group of "image position", are displayed in the adjustment item selection field 816. Note that in a case where all of the filtered adjustment items are not accommodated in the adjustment item selection field 816, the user can view adjustment items that are not accommodated in the adjustment item selection field 816, by operating slider bars 821 and 822.

In a case where a certain adjustment item is selected from the list in the adjustment item selection field 816, the settings of the selected adjustment item are displayed in a display field 826. For example, in a case where, as shown in FIG. 8, "trailing end white void correction" is selected in the adjustment item selection field 816, the settings of "trailing end white void correction" are displayed in the display field 826. When the user selects an edit button 827 in the display field 826 in this state, a trailing end white void correction screen 901, described hereinafter with reference to FIG. 9, is displayed on the display device 110.

When the user selects an OK button 823, the sheet information managed by each of the respective print control apparatus 101 and the printing apparatus 102 is updated based on the settings set on the new registration edit screen 801, and the sheet list displayed in the display area 414 is also updated based on the updated sheet information. On the other hand, when the user selects a cancel button 824, the new registration edit screen 801 is closed without updating the above-described sheet information.

Figure 9:
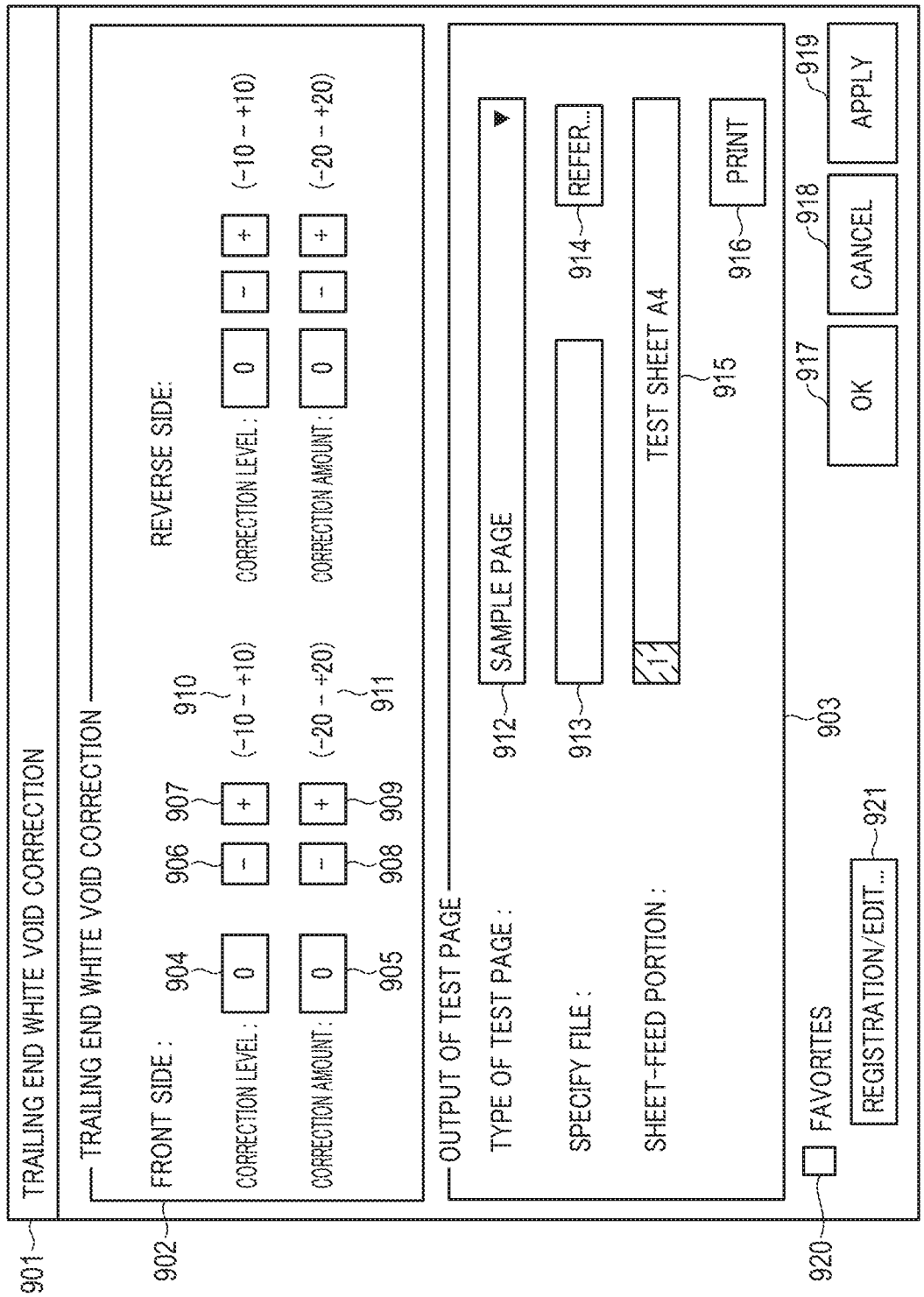
FIG. 9 is a diagram showing an example of a trailing end white void correction screen displayed on the display device appearing in FIG. 1.

FIG. 9 is a diagram showing an example of the trailing end white void correction screen 901 displayed on the display device 110 appearing in FIG. 1. The trailing end white void correction screen 901 is displayed on the display device 110 when the user selects the setting item button 720 on the sheet setting screen 701 or the edit button 827 on the new registration edit screen 801.

The trailing end white void correction screen 901 is formed by a trailing end white void correction area 902 and a test page output area 903. In the trailing end white void correction area 902, a correction level and a correction amount for each side of the sheets are set as settings of the trailing end white void correction. For example, the user uses a "−" button 906 and a "+" button 907 to set a correction level displayed in a text box 904 for a sheet front side. The user can adjust the correction level in a range indicated by correction information 910. Further, the user uses a "−" button 908 and a "+" button 909 to set a correction amount displayed in a text box 905 for the sheet front side. The user can adjust the correction amount in a range indicated by correction information 911.

In the test page output area 903, information on test page printing for checking whether or not the settings set in the trailing end white void correction area 902 are appropriate is set.

In a combo box 912, one of "sample page" and "desired PDF file" is selected. In a case where "sample page" is selected, the CPU 301 instructs the printing apparatus 102 to print a test page stored in the RAM 302 based on the settings set in the trailing end white void correction area 902. On the other hand, in a case where "desired PDF file" is selected, it becomes possible to operate a text box 913 and a "refer . . . " button 914 on the trailing end white void correction screen 901. When the user selects the "refer . . . " button 914, a dialog (not shown) for selecting a PDF file is opened. Note that in the present embodiment, a file format that can be selected by the user is not limited to PDF, but it may be a file in another format. Displayed in a text box 915 is information indicative of a sheet feed deck that is used when the test page printing is performed using the settings set in the trailing end white void correction area 902. When the user selects a "print" button 916, the CPU 301 instructs the printing apparatus 102 to start the test page printing. When the user selects an OK button 917, the sheet information is updated based on the settings set in the trailing end white void correction area 902 and the trailing end white void correction screen 901 is closed. When the user selects a cancel button 918, the trailing end white void correction screen 901 is closed without updating the sheet information. When the user selects an application button 919, the sheet information is updated based on the settings set in the trailing end white void correction area 902 and the display of the trailing end white void correction screen 901 is continued. The user can continue to change the settings or instruct the start of the test page printing, on the trailing end white void correction screen 901.

In a check box 920, it is set whether or not to register the trailing end white void correction as a favorite. The user can set details of information concerning favorite registration from a favorite setting screen (not shown) displayed by selecting a registration edit button 921. For example, the user sets, from the favorite setting screen, a name of the favorite, and one of a plurality of favorite groups, such as a "JOB-A" group and a "JOB-B" group, as a group to which the trailing end white void correction belongs. Note that although in the present embodiment, the description is given of the trailing end white void correction screen 901 as an example of the adjustment item setting screen, other adjustment item setting screens as well are provided with at least the check box 920 and the registration edit button 921. In short, in the present embodiment, the user can execute, from a setting screen for each adjustment item, registration of the adjustment item as a favorite.

Figure 10:
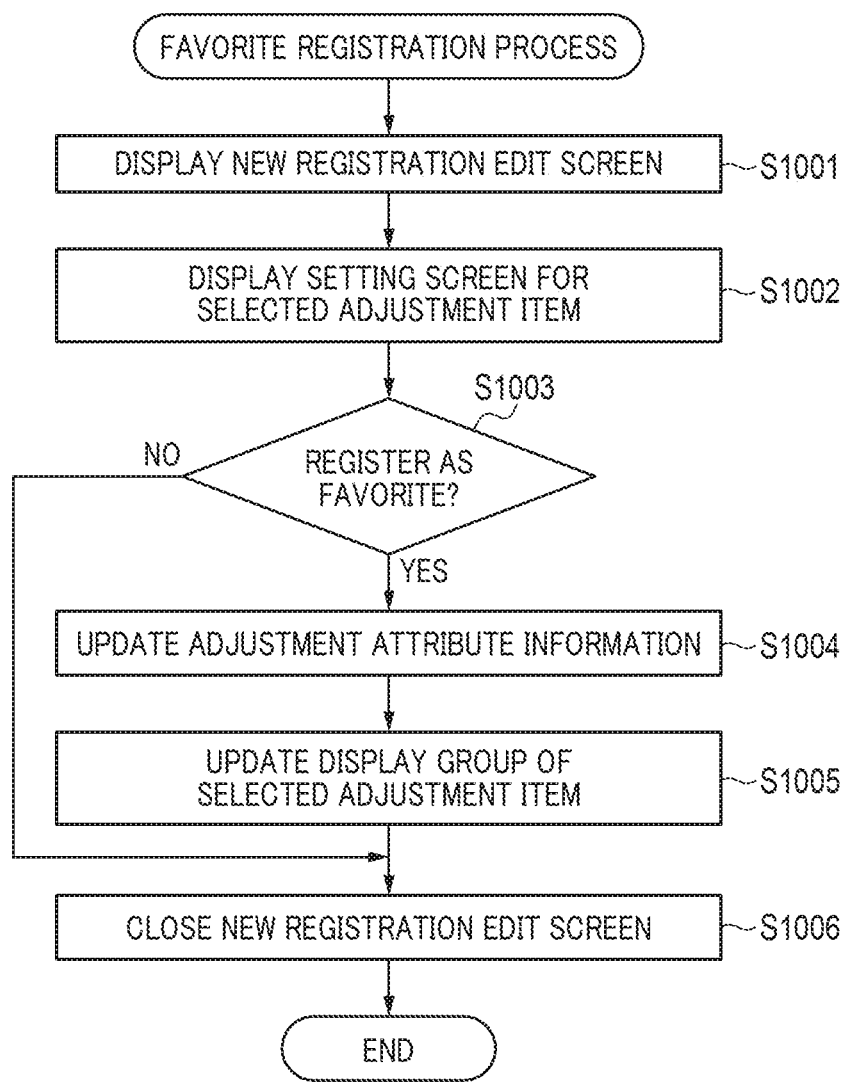
FIG. 10 is a flowchart of a favorite registration process performed by the print control apparatus appearing in FIG. 1.

FIG. 10 is a flowchart of a favorite registration process performed by the sheet management application 318 appearing in FIG. 3B. The process in FIG. 10 is performed by the CPU 301 executing a corresponding program loaded from the ROM 303 or the storage device 308 into the RAM 302. The process in FIG. 10 is executed when an instruction for displaying the new registration edit screen 801 is received from the user who selects e.g. the above-mentioned "other information" button 728 or the "new registration" button included in the sheet list displayed in the display area 414.

Referring to FIG. 10, first, the sheet management application 318 displays the new registration edit screen 801 on the display device 110 according to the received display instruction (step S1001). Then, when the user selects the edit button 827 in a state where one adjustment item has been selected from the list displayed in the adjustment item selection field 816, the sheet management application 318 displays a setting screen for the adjustment item thus selected (hereinafter referred to as the "selected adjustment item") on the display device 110 (step S1002). In the step S1002, for example, in a case where the user selects the edit button 827 in a state where "trailing end white void correction" has been selected from the list, the sheet management application 318 displays the trailing end white void correction screen 901 on the display device 110. Then, the sheet management application 318 determines whether or not to register the selected adjustment item as a favorite (step S1003). In the step S1003, for example, in a case where the user selects the OK button 917 in a state where the check box 920 has been checked on the trailing end white void correction screen 901 displayed on the display device 110, the sheet management application 318 determines that the selected adjustment item is to be registered as a favorite. On the other hand, in a case where the user selects the OK button 917 in a state where the check box 920 has not been checked, the sheet management application 318 determines that the selected adjustment item is not to be registered as a favorite. Note that when the OK button 917 on the trailing end white void correction screen 901 is selected, the trailing end white void correction screen 901 is switched to the new registration edit screen 801 on the display device 110.

If it is determined in the step S1003 that the selected adjustment item is not to be registered as a favorite, the sheet management application 318 executes a step S1006, described hereinafter. If it is determined in the step S1003 that the selected adjustment item is to be registered as a favorite, the sheet management application 318 updates adjustment attribute information indicating a display group of the selected adjustment item (step S1004). Then, the sheet management application 318 updates a display group 819 of the selected adjustment item in the adjustment item selection field 816 based on the updated adjustment attribute information (step S1005). In the step S1005, the character string "favorite" is added to the display group 819 of the selected adjustment item in the adjustment item selection field 816. For example, in a case where the selected adjustment item is "trailing end white void correction", a display group 819 of "trailing end white void correction" is displayed as "image quality/favorite". At this time, an item of "favorites" is added in the combo box 820. With this, in the step S1005 et seq., when the new registration edit screen 801 is displayed on the display device 110, it is possible to filter the display in the adjustment item selection field 816 by "favorites". When the user selects "favorites" in the combo box 820, for example, as shown in FIG. 11, only adjustment items including the character string "favorite" are displayed in the display group 819 in the adjustment item selection field 816. That is, in the present embodiment, when the user is prompted to select an adjustment item from a plurality of adjustment items in the adjustment item selection field 816, adjustment items registered as favorites are displayed in the adjustment item selection field 816. Then, the sheet management application 318 closes the new registration edit screen 801 (step S1006), followed by terminating the present process.

According to the above-described embodiment, out of the plurality of adjustment items concerning the print engine 207, the adjustment items registered as favorites are displayed. This makes it possible to dispense with necessity for the user to select a desired adjustment item from a large number of adjustment items, which enables the user to easily set the settings of an adjustment item.

Further, in the above-described embodiment, when the user is prompted to select an adjustment item from the plurality of adjustment items, the adjustment items registered as favorites are displayed. This makes it possible for the user to easily select a desired adjustment item.

Although the description has been given of the present invention based on the above-described embodiment, the present invention is not limited to the above-described embodiment. For example, out of the adjustment items, the adjustment items registered as favorites may displayed in the adjustment item display area 715 of the sheet setting screen 701.

In the above-described embodiment, it is necessary to open the new registration edit screen 801 from the sheet setting screen 701, select an adjustment item from the adjustment item selection field 816 of the new registration edit screen 801, and thereby open a setting screen for the adjustment item. On the other hand, in the print control apparatus 101, instead of opening the new registration edit screen 801, by selecting a setting item button displayed in the adjustment item display area 715 of the sheet setting screen 701 by user operation, a setting screen for an adjustment item is displayed on the display device 110. From a viewpoint of improvement in user operability for setting adjustment items, it is preferable that a favorite function concerning the display of adjustment items can be also applied to other than the adjustment item selection field 816 of the new registration edit screen 801, more specifically, to the sheet setting screen 701.

Accordingly, in a variation of the present embodiment, out of the adjustment items, the adjustment items registered as favorites are displayed in the adjustment item display area 715 of the sheet setting screen 701.

Figure 12:
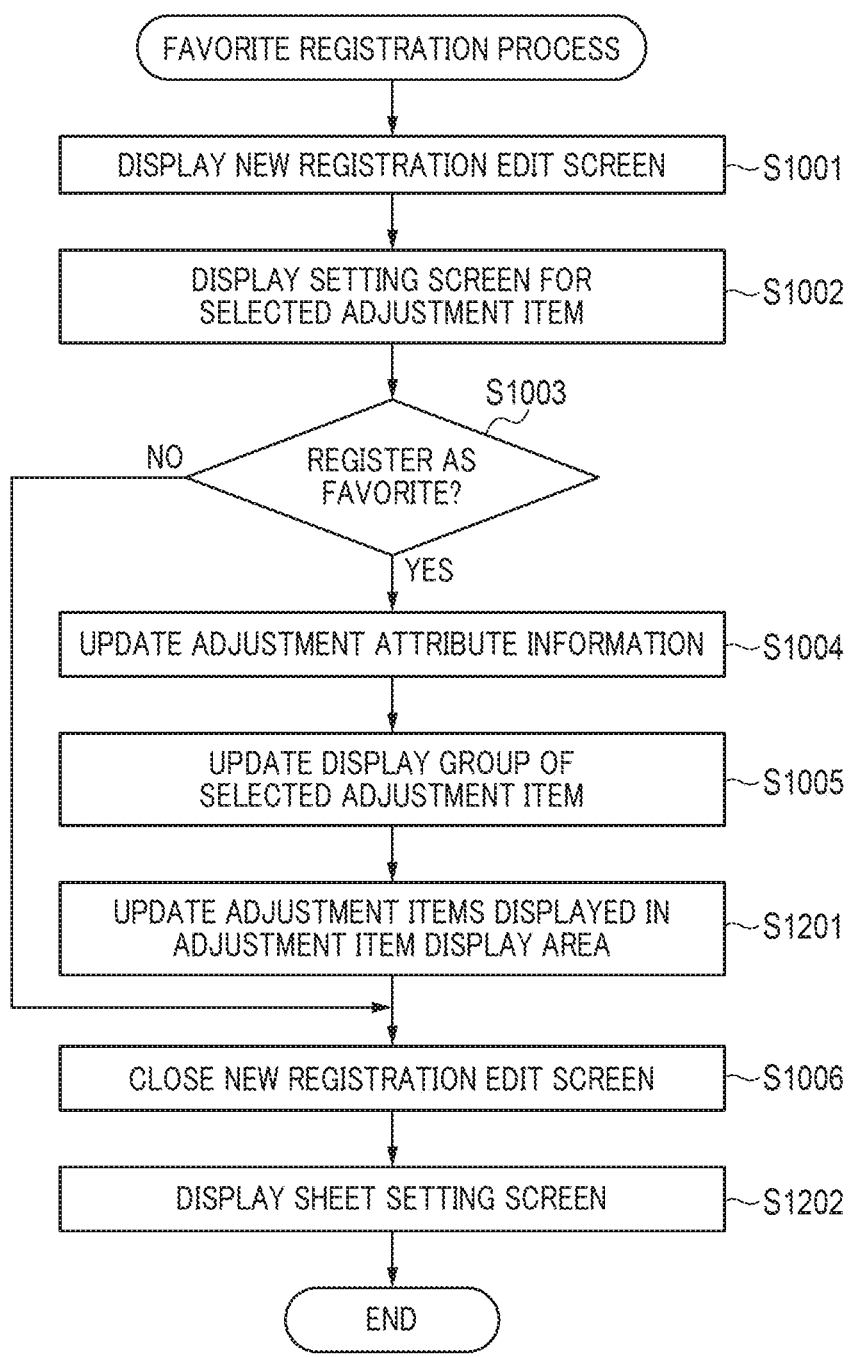
FIG. 12 is a flowchart of a variation of the favorite registration process in FIG. 10.

FIG. 12 is a flowchart of a variation of the favorite registration process in FIG. 10, which is performed by the variation of the present embodiment. Similar to the process in FIG. 10, the process in FIG. 12 as well is performed by the CPU 301 executing a corresponding program loaded from the ROM 303 or the storage device 308 into the RAM 302. Also similar to the process in FIG. 10, the process in FIG. 12 is executed when an instruction for displaying the new registration edit screen 801 is received from the user who selects e.g. the above-mentioned "other information" button 728 or the "new registration" button included in the sheet list displayed in the display area 414.

Referring to FIG. 12, the sheet management application 318 executes the steps S1001 to S1005. Then, the sheet management application 318 updates adjustment items displayed in the adjustment item display area 715 (step S1201). In the step S1201, for example, management information for managing the adjustment items displayed in the adjustment item display area 715 is stored in the storage device 308, and the adjustment items registered as favorites are added to the management information. Then, the sheet management application 318 executes the step S1006. Next, the sheet management application 318 waits until an instruction for displaying the sheet setting screen 701 is received. Upon receipt of the instruction for displaying the sheet setting screen 701, the sheet management application 318 displays the sheet setting screen 701 on the display device 110 based on the above-mentioned management information (step S1202). In the adjustment item display area 715, the adjustment items registered as favorites are displayed. Note that although in the present embodiment, from the viewpoint of improvement in the user operability for setting adjustment items, it is preferable that only the adjustment items registered in the favorites are displayed in the adjustment item display area 715, adjustment items other than the adjustment items registered as favorites may be displayed in the adjustment item display area 715 insofar as the user operability is not impaired. Then, the sheet management application 318 terminates the present process.

In the above-described embodiment, the adjustment items registered as favorites are displayed on the sheet setting screen 701 that include the "other information" button 728 for instructing switching to the new registration edit screen 801. This makes it possible for the user to display a setting screen for an adjustment item on the display device 110 without executing operation to open the new registration edit screen 801, which enables the user to more easily set the settings of an adjustment item.

Further, in the above-described embodiment, the sheet setting screen 701 is a setting screen for setting the sheet feed decks 116a to 116h that feed sheets for use in printing. This enables the user to easily set adjustment items when setting the sheet feed decks 116a to 116h.

In the above-described embodiment, the construction of the sheet feed section 116 is not limited to the above-mentioned construction, but it may be one including an inserter or a manual feed tray, for example.

Although in the above-described embodiment, the description has been given of the case where the respective screens described above with reference to FIGS. 4A, 4B, 7 to 9, and 11 are displayed on the display device 110 of the print control apparatus 101, the above-described screens may be displayed on the operation section 114 of the printing apparatus 102, whose display area is smaller than that of the display device 110. In doing this, instead of the print control apparatus 101, the printing apparatus 102 may execute the processes in FIGS. 6, 10, and 12. With this, in the printing apparatus 102 including the operation section 114 whose display area is smaller than that of the display device 110, it is possible to enable the user to easily set the settings of adjustment items.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-005292 filed Jan. 16, 2019, which is hereby incorporated by reference herein in its entirety.

What is claimed is:

1. An apparatus that is able to display a plurality of setting items regarding printing and that is able to receive setting values of the plurality of setting items from a user and is able to register the received setting values as attribute information of a sheet, comprising:
    a user interface that receives a selection of a setting item from among the plurality of setting items except for a part of the plurality of setting items;
    a controller that registers, as a favorite, the setting item selected via the user interface; and
    a display that, in accordance with receiving a display instruction to display the favorite through a screen on which the plurality of setting items are displayed, narrows down setting items to be displayed to a specific setting item which is registered as the favorite by a user out of the plurality of setting items, and displays the specific setting item,
    wherein the part of the plurality of setting items continues to be displayed on the screen even in a case where the display instruction to display the favorite is received through the screen.

2. The apparatus according to claim 1, wherein the user interface receives, from the user, a setting value of a setting item selected from the displayed specific setting items.

3. The apparatus according to claim 1, wherein the controller registers, as the favorite, the setting item selected via the user interface from among the plurality of setting items, in accordance with an instruction for a registration of the favorite.

4. The apparatus according to claim 1, wherein the controller registers the setting item selected by the user from among the plurality of setting items, as a user-selected favorite.

5. The apparatus according to claim 1, wherein a name of the favorite is settable by the user.

6. The apparatus according to claim 1, wherein the setting item includes an adjustment value of a secondary transfer voltage.

7. The apparatus according to claim 1, wherein the setting item includes an adjustment value of an amount of recording agent used for printing.

8. The apparatus according to claim 1, wherein the apparatus is a printing control apparatus communicable with a printing apparatus.

9. The apparatus according to claim 1, wherein the apparatus is a printing apparatus.

10. The apparatus according to claim 1, wherein the part of the plurality of setting items is a size of the sheet.

11. The apparatus according to claim 1, wherein the part of the plurality of setting items is a surface property of the sheet.

12. The apparatus according to claim 1, wherein the part of the plurality of setting items is a basis weight of the sheet.

13. The apparatus according to claim 1, wherein the part of the plurality of setting items is a color of the sheet.

14. A method of controlling an apparatus that is able to display a plurality of setting items regarding printing and that is able to receive setting values of the plurality of setting items from a user and is able to register the received setting values as attribute information of a sheet, comprising:
    receiving, via a user interface, a selection of a setting item from among the plurality of setting items except for a part of the plurality of setting items;
    registering, as a favorite, the setting item selected via the user interface; and
    in accordance with receiving a display instruction to display the favorite through a screen on which the plurality of setting items are displayed, narrowing down setting items to be displayed to a specific setting item which is registered as the favorite by a user out of the plurality of setting items, and displaying the specific setting item,
    wherein the part of the plurality of setting items continues to be displayed on the screen even in a case where the display instruction to display the favorite is received through the screen.

15. A non-transitory computer-readable storage medium storing a computer-executable program for executing a method of controlling an apparatus that is able to display a plurality of setting items regarding printing and that is able to receive setting values of the plurality of setting items from a user and is able to register the received setting values as attribute information of a sheet,
    wherein the method comprises:
    receiving, via a user interface, a selection of a setting item from among the plurality of setting items except for a part of the plurality of setting items;
    registering, as a favorite, the setting item selected via the user interface; and
    in accordance with receiving a display instruction to display the favorite through a screen on which the plurality of setting items are displayed, narrowing down setting items to be displayed to a specific setting item which is registered as the favorite by a user out of the plurality of setting items, and displaying the specific setting item,
    wherein the part of the plurality of setting items continues to be displayed on the screen even in a case where the display instruction to display the favorite is received through the screen.

* * * * *